United States Patent [19]

van der Velde et al.

[11] Patent Number: 4,621,747
[45] Date of Patent: Nov. 11, 1986

[54] APPARATUS FOR CHARGE-WISE DOSING A METERED VOLUME QUANTITY OF A FLOWING MEDIUM CONTINUOUSLY SUPPLIED TO THE APPARATUS UNDER DELIVERY PRESSURE

[75] Inventors: Ype Y. van der Velde, Wommels; Athanasius A. Bootsma, Sneek, both of Netherlands

[73] Assignee: Tebel Machinefabrieken B.V., Netherlands

[21] Appl. No.: 625,513

[22] Filed: Jun. 28, 1984

[30] Foreign Application Priority Data

Jul. 1, 1983 [NL] Netherlands ............... 8302358

[51] Int. Cl.[4] .......................................... B67D 5/56
[52] U.S. Cl. ............................ 222/137; 222/145; 222/252; 222/450; 137/99; 141/261; 366/180; 366/187; 366/194; 425/206; 425/257; 425/564
[58] Field of Search ........ 222/377, 450, 249, 135–137, 222/145, 252, 253, 255, 265, 309, 275–277, 425, 440, 445, 447, 426, 428, 429, 430, 436, 451; 141/302, 258–262; 92/110; 137/99; 99/452; 425/130, 200, 206, 207, 256, 257, 542, 562, 564; 366/177, 178, 180, 184, 187, 188, 190, 194, 196; 417/503, 343, 398, 404

[56] References Cited

U.S. PATENT DOCUMENTS

| | | | |
|---|---|---|---|
| 2,283,230 | 5/1942 | Rogers | 222/447 X |
| 2,896,556 | 7/1959 | Sippel et al. | 366/177 X |
| 2,946,488 | 7/1960 | Kraft | 222/137 X |
| 3,071,293 | 1/1963 | Lewis-Smith et al. | 222/145 X |
| 3,642,175 | 2/1972 | Robbins | 222/255 X |
| 3,767,085 | 10/1973 | Cannon et al. | 222/137 X |
| 3,926,345 | 12/1975 | Pulk et al. | 222/145 |
| 4,565,304 | 1/1986 | Dronet | 222/450 X |

Primary Examiner—Joseph J. Rolla
Assistant Examiner—Kevin P. Shaver
Attorney, Agent, or Firm—Manfred M. Warren; Robert B. Chickering; Glen R. Grunewald

[57] ABSTRACT

An apparatus for charge-wise dosing a metered volume quantity of liquid medium to be supplied continuously under delivery pressure, comprising a pair of serially connected cylinder-and-piston assemblies of different diameters the cylinder blocks being arranged axially relatively to each other, forming a composite housing; a supply conduit for the flowing medium connected to the smaller diameter cylinder block and a filling nozzle connected to the larger diameter cylinder block and containing a discharge opening; a tube operating as a piston member for reciprocation in the composite housing, which tube is in direct communication with the smaller diameter cylinder block and connected to the larger diameter cylinder block via a passage provided in the larger diameter piston. The tube operating as piston member carries at least the larger diameter piston; a first valve by means of which the passage in the larger diameter piston is closable and a second valve by means of which the access to the filling nozzle is closable; and an assembly for operating the valves and controller therefor.

7 Claims, 9 Drawing Figures

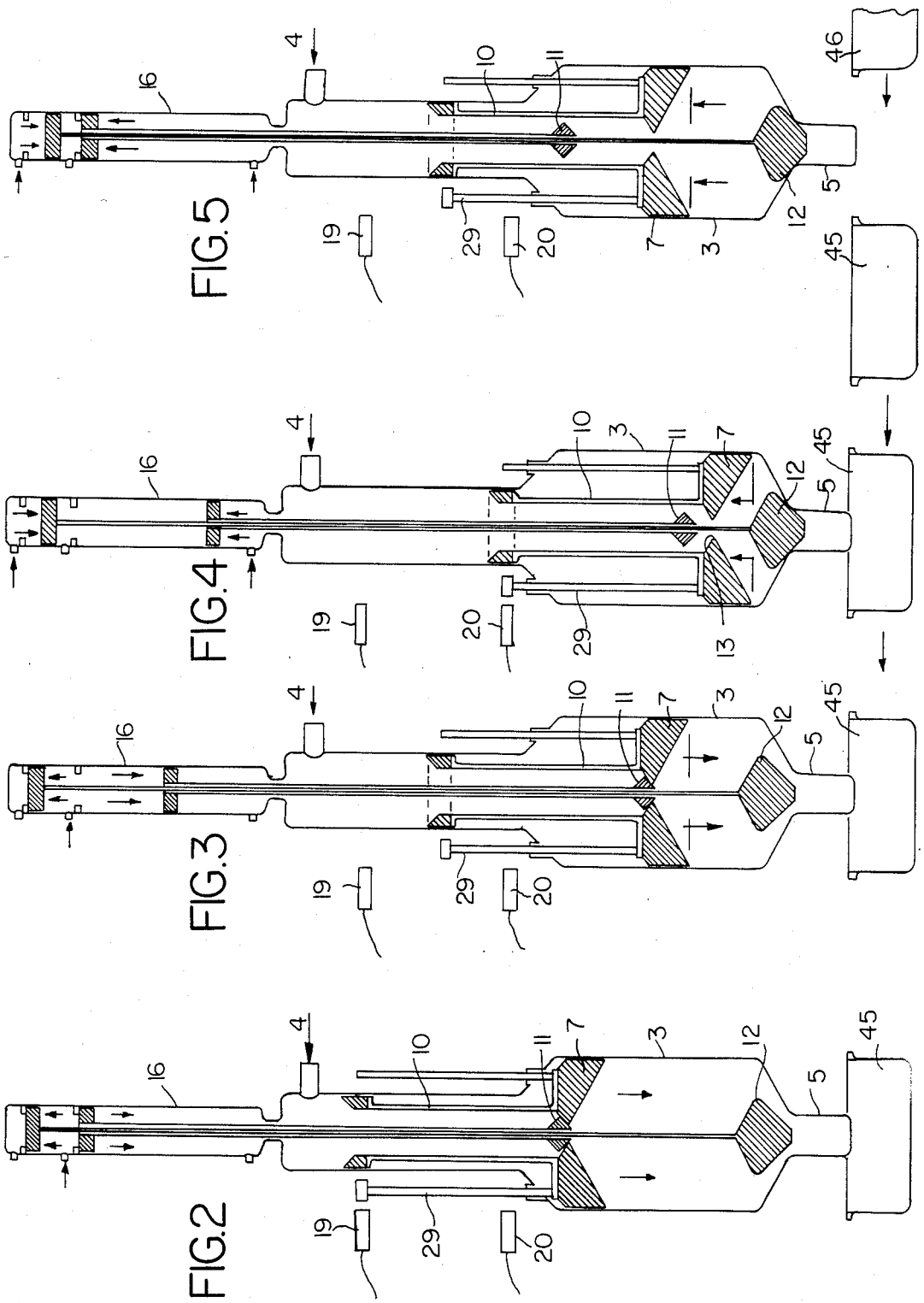

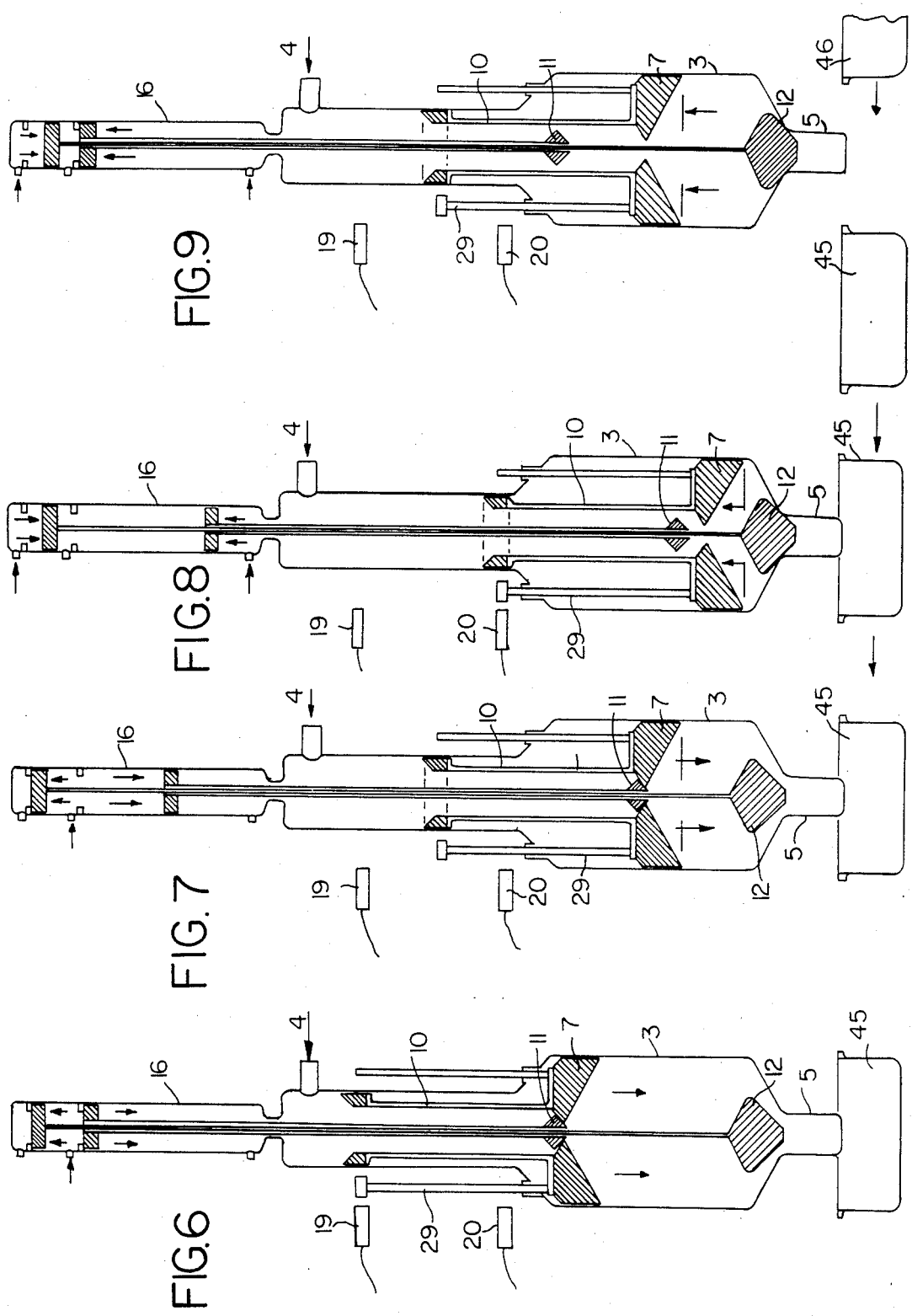

APPARATUS FOR CHARGE-WISE DOSING A METERED VOLUME QUANTITY OF A FLOWING MEDIUM CONTINUOUSLY SUPPLIED TO THE APPARATUS UNDER DELIVERY PRESSURE

The invention relates to an apparatus for charge-wise dosing a metered volume quantity of liquid medium to be continuously supplied to the apparatus under delivery pressure.

Besides the classical method of cheese preparation, a novel cheese preparation process has become available in which the cheese is prepared from a concentrate of milk components obtained by ultra-filtration (U.F.) of milk. In this process the major portion of the moisture present in the milk is separated already before the coagulation phase by ultra-filtration. So-called pre-cheese is prepared from the concentrate of milk components by e.g. combination with cream having a high fat content. Subsequently, starter and rennet are added and the resulting product is filled in molds. The coagulation process proper takes place in these molds. The brining and the ripening take place in a more or less traditional manner in a subsequent phase.

The pre-cheese is a homogeneous viscous liquid material from which substantially no water is separated. An accurately metered volume of the pre-cheese as a result will provide a cheese having a more accurate weight. Within the scope of the U.F. cheese preparation process the filling-up of an accurately metered volume quantity of pre-cheese in molds is an important processing step for that reason. A complication going therewith is that the rennet addition should take place shortly before the filling-up of the pre-cheese to the molds in order to have a minimal residence time in the filling-up device. If not, blockages may occur in the apparatus by the coagulating product. Finally, it has been found better for reasons of process technology if the supply of the pre-cheese formed at the point where the molds are filled up takes place continuously.

It is an object of the invention to provide an apparatus in accordance with the above by means of which it is possible to dose a liquid material charge-wise, while this material should be adapted to be continuously supplied to the apparatus.

A further object of the invention is to provide an apparatus of the above indicated type by means of which the pre-cheese formed in the U.F. cheese preparation process can be dosed in accurately-metered volume quantities to the molds, while the apparatus in question simultaneously offers the possibility of effecting therein the addition of starter and rennet necessary for the preparation of cheese in the proper contents.

The invention is characterized by a pair of serially connected cylinder-and-piston assemblies of different diameters the cylinder blocks of which are arranged axially relatively to each other, with formation of a composite housing; a supply conduit for the flowing medium connected to the smaller diameter cylinder block and a fill-up nozzle having a discharge opening and connected to the larger diameter cylinder block; a tube acting as a piston member reciprocatable in the composite housing, said tube being in direct communication with the smaller diameter cylinder block and being connected to the larger diameter cylinder block by means of a passage provided in the larger diameter piston, while the tube acting as piston member at least carries the larger diameter piston; a first valve by means of which the passage in the larger diameter piston is closable and a second valve by means of which the access to the fill-up nozzle is closable; and by means for operating the valves and control means therefor.

As will be explained subsequently, it is possible with the apparatus according to the invention within an operating cycle to alternately meter in a first stage a specific volume quantity of the liquid flowing medium (metering stroke), which volume quantity can subsequently be dosed in a second stage to a container (ejection stroke), while during the metering stroke in the first stage, when no discharge of the liquid material takes place, there is an opportunity of discharging the filled container and of replacing the same by an empty one. During the ejection or fill-up stroke in the second stage there takes place simultaneously an increase in volume of the receiving space for the liquid flowing medium and consequently this continuously supplied medium can be stored in the apparatus. Moreover, as will also be explained in the following, the apparatus according to the invention also offers the possibility of an embodiment wherein one or more aggregates in the proper ratio are supplied to and mixed with the flowing medium available in the apparatus.

The invention is based on the insight that the liquid medium continuously supplied under delivery pressure can serve itself as operating medium and hence as driving means for the dosing apparatus. The result of this starting point implies in practice that the dosing apparatus functions as long as there is supply of the flowing medium at a pressure sufficiently large to overcome the friction of the reciprocating piston member. If the supply is discontinued, also the dosing apparatus ceases to function. After resumption of the supply, also the dosing apparatus resumes its function. Due to these properties of the apparatus according to the invention, a safe functioning thereof is ensured.

One embodiment of the apparatus according to the invention will now be described, by way of example, with reference to the accompanying drawings. This apparatus is destined as fill-up apparatus for the cheese molds within the scope of the U.F. cheese preparation process. However, the invention is not restricted to such an embodiment, but may also serve for dosing metered volume quantities of other liquid flowing media, insofar as these media are supplied continuously at a specific capacity and pressure in the apparatus.

In the drawings,

FIGS. 2–9 show a diagrammatic longitudinal section of only the fill-up head exclusively with the purpose of representing the successive positions of the piston member and the valves during an operating cycle, while a number of constructive details of the fill-up head, as shown in FIG. 1 have been left out.

Figure 1:
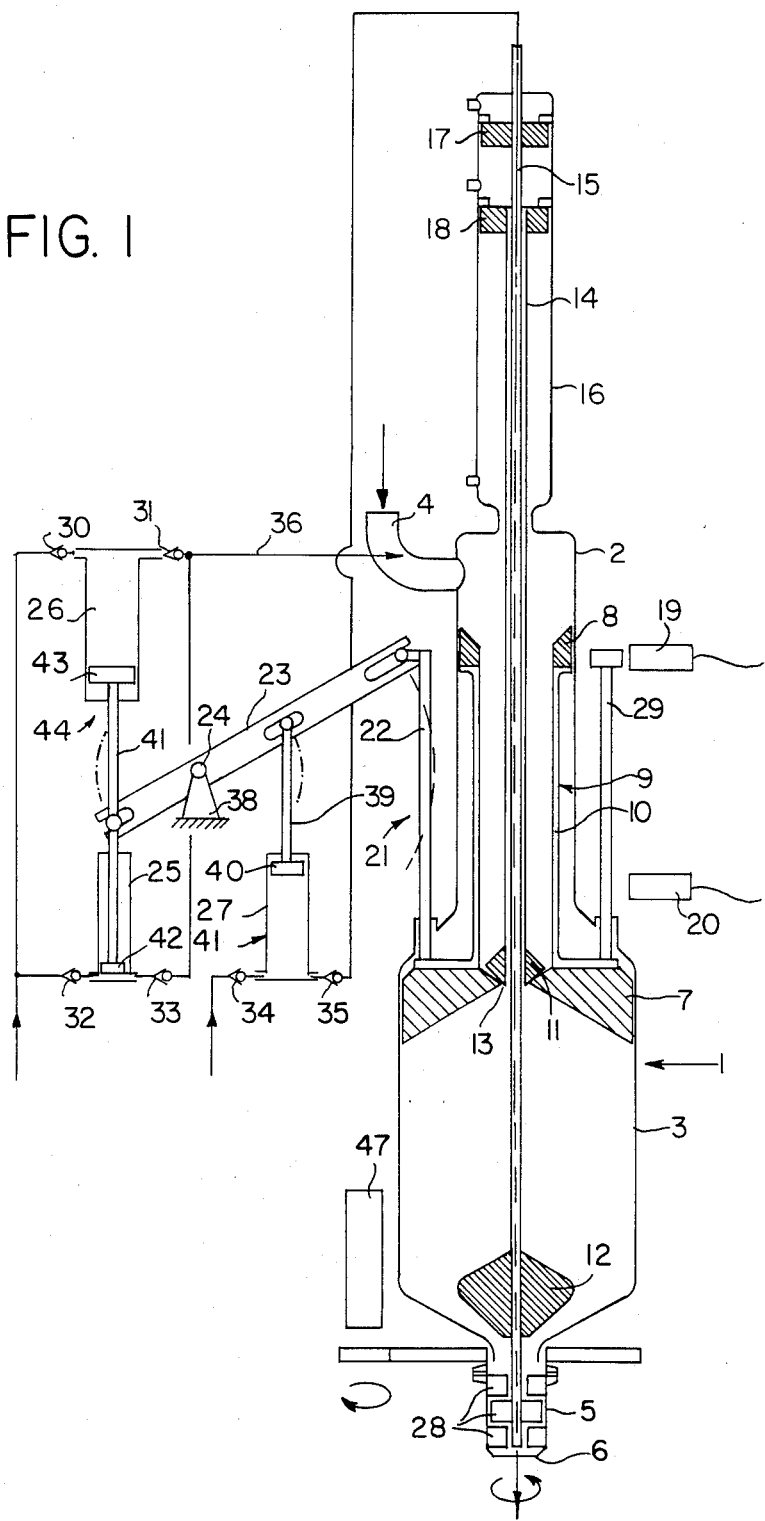
FIG. 1 is a longitudinal view of a fill-up apparatus according to the invention, provided with a rennet and starter dosage and which is suitable as such for application in the U.F. cheese preparation process.

The drawing (FIG. 1) shows the vertically arranged fill-up head 1 composed of cylinder block 2 of smaller diameter d and cylinder block 3 of larger diameter D. The cylinder block 2 comprises an inlet pipe branch 4, while the cylinder block 3 is provided at its lowest point with the fill-up nozzle 5 having a fill-up opening 6. Within a portion of the fill-up nozzle 5, adapted to be rotated by means of the drive motor 47, is provided a mixing member in the form of a system of coacting vanes 28.

In the fill-up head 1, 7 and 8 represent a piston of larger and smaller diameter, respectively, fixedly coupled to the endportions of the connecting tube 10, thus together forming the piston member 9 movable up and down in the fill-up head. Piston 7 is provided with a concentrically disposed passage 13.

At 11 and 12 respectively are indicated valves, valve 11 being adapted to shut off the passage 13 and hence the connection between the cylinder blocks 2 and 3.

Valve 11 is attached to the hollow valve rod 14, which is provided at the other end with a piston 18, as valve 12 is attached to the likewise hollow valve rod 15, which is provided at its other end with the piston 17. Valve rods 17 and 18 are telescopically provided about one another, while pistons 17 and 18 are enclosed within the air cylinder 16 for up and down movement.

Piston 7 engages with a lever system 21, comprising a rod 22 and the lever 23 which are inter-connected by means of a sliding coupling. The lever 23 is pivotally carried at 24 by the supporting element 38. The lever 23 furthermore is connected by means of a sliding coupling to the piston rod 39 at the end of which there is provided a piston 40 enclosed within the cylinder block 27. Piston 40 and cylinder 27 together form a single-acting pump 41.

Furthermore, the lever 23 is connected to piston rod 41 by means of a sliding coupling, to both ends of which rod there are attached pistons 42, 43 which are enclosed in cylinder blocks 25 and 26, respectively. The piston rod 41 with pistons 42, 43 attached thereto and cylinder blocks 25, 26 together form a double-acting pump 44. The diameters of the cylinder blocks 25, 26 are chosen in conformity with those of cylinder blocks 2, 3 of the fill-up head: i.e. cylinder block 25 has a diameter d and cylinder block 26 a diameter D. Through conduit 27 pump 41 is connected to the hollow valve rod 15 while the pump 44 is connected through conduit 36 to the inlet tube branch 4. Furthermore, the conduit systems connected to pumps 44 and 41 are provided with the necessary check valves 30/33 and 34, 35 respectively. This valve system conventionally ensures the opening and closing of the conduits connected to pumps 41 and 44 in a proper and timely manner during the delivery and suction stroke of the respective pumps.

The control of valves 11 and 12 in the fill-up head by means of the air cylinder 16 takes place via signals which are transmitted by 2 initiators 19 and 20, which in coaction with the indicator rod 29 connected to the piston member 9, respond to the upper and lower position of the piston member 10.

The operation of the fill-up head employed for dosing a metered volume quantity of pre-cheese to a mold can be explained as follows by means of FIGS. 2–9. Pump 41 functions as rennet pump, pump 44 as starter pump.

During a working cycle of the fill-up head, the following phases can be distinguished:

a. Starting-up: FIG. 2 and FIG. 3

The piston member 7 is in the upper position. The air cylinder 16 maintains the first valve 11 closed and the second valve 12 open. Upon supply of pre-cheese under delivery pressure via the inlet tube branch 4 to the fill-up head, this will be pushed downwardly by application of pressure on the piston member 10.

b. End of starting-up stroke/beginning metering stroke: FIG. 3 and FIG. 4

In the lower position of the piston member 7 the initiator 20 transmits a signal when the initiator is reached by the indicator rod 29 so that the second valve 12 is closed via the air cylinder and the first valve 11 is opened. At constant supply of the pre-cheese there is now produced through the difference in surface area a force differential between the upper and lower end of the piston member 10 in such a way, that the piston member rises. The cylinder block 3 of larger diameter D positioned underneath piston 7 will be filled with pre-cheese through the passage 13.

c. End metering stroke/beginning ejection stroke: FIG. 6 and FIG. 7

Back in the upper position, a signal is transmitted to the air cylinder 16 when the initiator 19 is reached by the indicator rod 29, thus reaching the pre-set fill-up volume, in such a manner that the second valve 12 is opened and the first valve 11 is closed. The delivery pressure at which the pre-cheese is continuously supplied again ensures that the piston member 10 is pressed downwardly. Now the metered volume quantity of pre-cheese is forced out of the cylinder block of larger diameter 3 and filled-up via the fill-up nozzle 5 in the mold arranged underneath the fill-up head.

During the downward movement of the piston member 10 a larger volume is automatically released above the first valve 11 wherein the continuously supplied pre-cheese can be buffered. It is thus achieved that during the filling-up of the metered volume quantity a continuous supply of the pre-cheese to the fill-up head remains possible.

d. End expulsion stroke/beginning metering stroke: FIG. 8

When, as a result of the movement described under c. the piston member has reached the lower position, a new cycle is again started, i.e. a new volume quantity is metered in the cylinder block 3 which is subsequently again driven out, etc.

It clearly follows from the above that during the metering stroke no discharge of pre-cheese from the fill-up head takes place, so that there is time to remove the mold 45 filled-up with the pre-cheese, and to replace the same by an empty mold 46: FIG. 9.

During the downward stroke of the piston member 10 (ejection or fill-up stroke) the lever system 21 (FIG. 1) is driven by the piston member 10. The rennet pump 41 only pumps during this downward stroke, while a fixed ratio of rennet and pre-cheese is pumped per unit of time by the movement derived. The rennet is conducted through conduit 37 and the hollow valve rod 5 beyond the second valve 12 into the fill-up nozzle 5, which is rotated by the drive motor 47. This produces in the fill-up nozzle 5 through the vanes 28 a powerful mixing movement in the pre-cheese-containing material available therein and a homogeneous distribution of the rennet through the material is achieved.

In order to prevent an uncontrolled outflow of rennet from the valve rod 15, the outlet opening of the valve rod is covered by a rubber diaphragm, not shown.

In addition to rennet also starter is to be added to the pre-cheese in the preparation of cheese. The arrangement of the starter pump 44 and the rennet pump 41 in the fill-up apparatus according to the invention is such that the starter and the rennet are added separately to the pre-cheese, which is advantageous. Moreover, it is beneficial in general in the cheese preparation process if first the starter is added to the pre-cheese and is mixed homogeneously therewith before adding the rennet and to mix it in turn with the whole, but the starter addition on the other hand may not take place too long before the rennet dosing. Compliance is also made with the latter wishes by the arrangement of the starter pump 44 and the rennet pump 41, using the fill-up head according to the invention as mixing member.

As already observed the starter pump 44 is a double-acting pump which is connected through the conduit 36 to the inlet tube branch 4 within which, if desired, also a mixer may be provided.

The starter pump 44 is driven also by the lever system 21. In contrast to the rennet dosing, in connection with the continuous supply of the pre-cheese to the fill-up head, the starter dosing should take place both during the metering stroke and during the ejection stroke of the piston member 10, which is the reason that the starter pump is a double-acting pump. In order to obtain therewith a constant ratio between the pre-cheese supplied and the starter, the starter pump 44, however, should not only be double-acting, but the diameters of the pistons should be different. The piston strokes as a matter of fact are a derivative from the metering, and the ejection stroke, respectively, of the piston member 10. These strokes are identical to each other as regards length but not identical as regards diameter and hence volume. Hence, the diameters of pistons 42 and 43 in the double-acting starter pump 44 are likewise D and d, respectively.

The metering volume and hence also the eventual fill-up volume depends in principle on the diameter D of the cylinder block of larger diameter and on the stroke length of the piston member 10. Change in metering volume therefore can be attained by changing the length of the metering stroke. In the fill-up apparatus according to the invention and shown in the drawing this can be realized by lifting or lowering the initiator 19, which is adjustable in height.

The total cycle duration $t^t$ depends on the supply capacity of the pre-cheese and the fill-up volume Q: $t^t = Q/q$. Furthermore, $t^t = t^a + t^1$, wherein $t^a$ = metering duration and $t^1$ = ejection duration. The ratio $t^1/t^a$ follows from the formula $t^1/t^a = d^2/(D^2 - d^2)$, wherein, as already observed, D is the diameter of the broader cylinder block 3 and d the diameter of the narrower cylinder block 2.

Naturally, alterations can be made to the fill-up apparatus, as discussed in the above and shown in the drawing without departing from the scope of the invention. For instance, it can be observed in this connection that the accuracy of the fill-up volume depends on the reproducibility of the stroke length. This reproducibility of the stroke length of the piston member 10 depends on the opening and closing moment of the valves 11, 12 which again depends inter alia on the response moment of the initiator and the speed of the air cylinder and hence also the valve speed.

For increasing the accuracy of the fill-up volume a provision could now be made for instance which might consist of:

a. an adjustable mechanical stop limiting exactly the stroke of the piston member 10 a, and b. such a control of the valves that, in the upper position of the piston member 10, the valve 11 is first closed before valve 12 is opened, and in the lower position of the piston member first valve 12 is closed before valve 11 is opened. For bridging the short moment wherein both valves 11 and 12 are closed, a pre-cheese accumulator is provided in the supply conduit which may also function as excess pressure protection.

What we claim is:

1. An apparatus for charge-wise dosing a metered volume of a flowing medium to be supplied continuously under a delivery pressure comprising: a pair of serially connected cylinders and pistons of different diameters, said cylinders comprising cylinder blocks axially arranged relatively to each other and connected together to form a composite housing; a supply conduit for the flowing medium connected to the smaller diameter cylinder block; a fill-up nozzle having a discharge opening and connected to the larger diameter cylinder block; a tube assembly including said smaller diameter piston, said tube assembly being mounted for reciprocation in the composite housing, said tube assembly being in direct communication with the smaller diameter cylinder block and being connected to the larger diameter cylinder block via a passage provided in the larger diameter piston, and said tube assembly carrying at least the larger diameter piston; a first valve mounted proximate the passage in the larger diameter piston for closing and opening of the passage; a second valve mounted proximate the access to the fill-up nozzle for closing and opening the access to the fill-up nozzle, valve operating means coupled for operation of the valves; and control means coupled to said valve operating means.

2. An apparatus according to claim 1 wherein, the fill-up nozzle is connected to a supply conduit for aggregate material.

3. An apparatus according to claim 1, and follower means coupled to the larger diameter piston and formed to follow its movement, said follower means extending through the larger diameter cylinder block and being connected to at least one dosing unit for operation of said unit therethrough for dosing one or more aggregates of the flowing medium available in the apparatus.

4. An apparatus according to claim 3 wherein, the at least one dosing unit comprises a double acting pump and a single acting pump, said follower means is connected to said double-acting pump with a pressure pipe of double-acting said pump connected to the supply conduit of the flowing medium to the smaller diameter cylinder block, and said follower means is further coupled to said single-acting pump with a pressure pipe of said single-acting pump connected to a supply conduit of the fill-up nozzle.

5. An apparatus according to claim 3 wherein, the fill-up nozzle is connected to a supply conduit for aggregate material.

6. An apparatus according to claim 5 wherein, the at least one dosing unit comprises a double acting pump and a single acting pump, the follower means is connected to said double-acting pump with a pressure pipe of said double acting pump connected to the supply conduit of the flowing medium to the smaller diameter cylinder block, and said follower means is further coupled to said single-acting pump with a pressure pipe of said single-acting pump connected to the supply conduit of the fill-up nozzle.

7. An apparatus according to claims 1, 2, 3, 4, 5 or 6 wherein, the fill-up nozzle contains a rotatably driven, detachable portion having mixing means mounted therein.

* * * * *